| United States Patent [19] | [11] Patent Number: 4,900,042 |
|---|---|
| Genda | [45] Date of Patent: Feb. 13, 1990 |

[54] FLUID SEALING STRUCTURE

[75] Inventor: Toshinobu Genda, Tochigi, Japan

[73] Assignee: Tochigifujisangyo Kabushiki Kaisha, Tochigi, Japan

[21] Appl. No.: 245,663

[22] Filed: Sep. 16, 1988

[30] Foreign Application Priority Data

Sep. 24, 1987 [JP] Japan ............................ 62-144439[U]

[51] Int. Cl.$^4$ .............................................. F16J 15/44
[52] U.S. Cl. ...................................... 277/70; 277/176; 277/188 R; 277/207 R; 277/215; 384/477
[58] Field of Search ................. 277/134, 152, 153, 27, 277/173, 174, 175, 176, 177, 165, 26, 21, 22, 83, 28, 29, 70, 71, 75, 188 R, 207 R, 215; 384/477

[56] References Cited

U.S. PATENT DOCUMENTS

| 2,162,218 | 6/1939 | Hill | 277/75 |
|---|---|---|---|
| 3,100,647 | 8/1963 | Lee | 277/75 |
| 3,480,284 | 1/1969 | Voitik | 277/29 |
| 4,674,754 | 6/1987 | Lair et al. | 277/70 |
| 4,712,801 | 12/1987 | Kaller | 272/126 |

FOREIGN PATENT DOCUMENTS

| 562858 | 10/1930 | Fed. Rep. of Germany | 277/71 |
|---|---|---|---|
| 1112626 | 11/1954 | France | 277/20 |
| 1135032 | 10/1955 | France | 277/20 |

*Primary Examiner*—William A. Cuchlinski, Jr.
*Assistant Examiner*—Jeffrey J. Hohenshell
*Attorney, Agent, or Firm*—Samuels, Gauthier, Stevens & Kehoe

[57] ABSTRACT

In a fluid sealing structure having an annular sealing member and a backup ring which supports the annular sealing member, for sealing a fluid charged in a working chamber formed by two relatively rotatable members, the backup ring is formed with at least one communication cavity for discharging fluid, charged from outside to between the sealing member and the backup ring when pressure within the working chamber drops, after pressure within the working chamber rises, so that the sealing member is not deformed into damage due to expansion of the charged fluid at high temperature.

5 Claims, 4 Drawing Sheets

FLUID SEALING STRUCTURE

BACKGROUND OF THE INVENTION

1. Field of the Invention

The present invention relates to a fluid sealing structure and more specifically to a structure for sealing fluid charged in a working chamber formed by two relatively rotatable members.

2. Description of the Prior Art

The fluid sealing structure of this type is adopted, for instance, for a power transmission system for a four-wheel drive vehicle, being called viscous coupling.

FIG. 1(A) is a cross-sectional view for assistance in explaining a viscous coupling by way of example of the fluid sealing structure.

In the drawing, a fluid sealing structure is composed of an inner shaft 1, an outer shaft 3 arranged rotatable and coaxial with respect to the inner shaft 3, and a disk-shaped side wall 5. The outermost circumference of the side wall 5 is welded to an end of the outer shaft 3 and the innermost circumference of the side wall 5 is sealably fitted to the outer circumferential surface of the inner shaft 1 so as to form a fluid working chamber 11.

A viscous fluid such as silicon oil is charged within this fluid working chamber 11. Within this fluid working chamber 11, a plurality of fluid resistance plates 9 fixed to the outer circumference of the inner shaft 1 and a plurality of fluid resistance plates 7 fixed to the inner circumference of the outer shaft 3 are arranged alternately at regular intervals along the axial direction of the shafts 1 and 3.

To rotatably seal viscous fluid within the working chamber 11 formed by the two inner and outer shafts 1 and 3 and the side wall 5, an annular recess 17 is formed in an inner circumferential surface 13 of the side wall 5. Within this annular recess 17, there are provided an annular elastic sealing member 19 made of rubber, for instance and a backup right 21 made of ethylene tetrafluoride resin including copper powder, for instance.

Therefore, when pressure within the working chamber 11 rises, since the sealing member 19 is compressed in the axial direction of the shaft and supported by the backup spring 21, the radially inner portion of the sealing member 19 is brought tight contact with the outer circumferential surface of the inner shaft 1 to prevent the high pressure fluid from leaking from a space between the inner shaft 1 and the side wall 5.

In the prior-art viscous coupling, however, when the coupling is disposed within a gear box of a transfer case or a limit slip differential gear for distributing an engine power to the front and rear wheel shafts in a four-wheel driving vehicle, and therefore dipped within a gear oil there exists a problem in that gear oil enters a space between the sealing member 19 and the backup ring 21 between the outer circumference 15 of the inner shaft 1 and the inner circumference 13 of the side wall 5 as shown by an arrow A in FIG. 1(B), in particular when the pressure within the working chamber 11 is lowered during vehicle stop or when the inner shaft 1 is vibrated in the axial direction thereof to cause an oil pumping action.

Under these conditions, when the plural fluid resistance plates 7 and the plural fluid resistance plates 9 start rotating relative to each other in differential operation to transmit power, the temperature within the working chamber 11 rises and therefore the temperature of the gear oil between the sealing member 19 and the backup ring 21 also rises due to thermal conduction. Here, since the coefficient of expansion of the gear oil is larger than that of the working fluid, the heated gear oil expands at high temperature, so that the sealing member 19 is urged toward the working chamber 11. In other words, since the sealing member 19 is deformed, the lip portion 23 (the inner projection) of the sealing member 19 is urged to enter a space formed between the inner circumferential surface 13 of the side wall 5 and the outer circumferential surface 15 of the inner shaft 1. As a result, the lip portion 23 is damaged due to the differential motion between the two shafts and therefore there exists a problem in that a sealing function will be damaged or the durability of the sealing member is degraded.

To overcome this problem, it is also possible to provide an additional backup ring 21 on the working chamber side. In this method, however, the number of parts increases and further the assembly work of the two backup rings 21 and the sealing member 19 into the recessed portion 17 becomes complicated, thus resulting in a higher cost.

SUMMARY OF THE INVENTION

With these problems in mind, therefore, it is the primary object of the present invention to provide a fluid sealing structure which can prevent the sealing member from being damaged or worn away, when fluid pressure and temperature within the working chamber change, without increasing the number of parts or complicating the assembly work.

To achieve the above-mentioned object, a fluid sealing structure, according to the present invention, having an annular sealing member and a backup ring which support the annular sealing member, for sealing a fluid charged in a working chamber formed by two relatively rotatable members is characterized in that the backup ring is formed with at least one communication cavity for discharging fluid, charged from outside to between the annular sealing member and the backup ring when pressure within the working chamber drops, after pressure within the working chamber rises, so that the annular sealing member is not deformed into damage due to expansion of the charged fluid at high temperature.

The communication cavity comprises (a) at least one annular groove formed on one surface of the backup ring; and (b) a plurality of through holes formed at regular angular intervals along the annular groove. Further, the communication cavity comprises (a) a plurality of radially extending grooves formed on at least one surface of the backup ring; and (b) a plurality of cutouts each formed at a radially innermost or outermost end of each of the radially extending groove.

In the fluid sealing structure according to the present invention, since at least one communication hole is formed in the backup ring, it is possible to discharge gear oil charged between the sealing member and the backup ring when the pressure within the working chamber drops due to differential revolution stop, through the communication hole, after the pressure and temperature within the working chamber rises due to differential revolution start. Therefore, it is possible to prevent the lip portions of the sealing member from being urged toward the inner shaft into damage or wear due to expansion of gear oil, thus improving the fluid sealing characteristics and sealing durability.

BRIEF DESCRIPTION OF THE DRAWINGS

The features and advantages of the fluid sealing structure according to the present invention will be more clearly appreciated from the following description of the preferred embodiment of the invention taken in conjunction with the accompanying drawings in which.

DETAILED DESCRIPTION OF THE PREFERRED EMBODIMENTS

Embodiments of the fluid sealing structure of the present invention will be described hereinbelow with reference to the attached drawings.

Figure 1A:
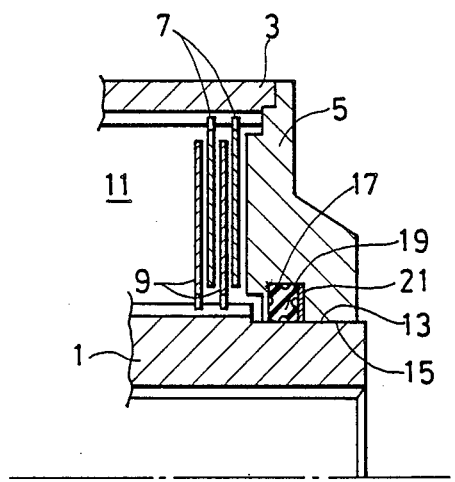
FIG. 1(A) is a partial cross-sectional view showing a prior-art fluid sealing structure.
Figure 1B:
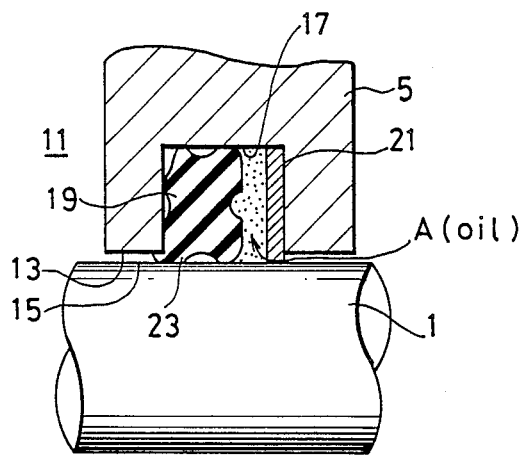
FIG. 1(B) is an enlarged cross-sectional view for assistance in explaining a problem involved in the prior-art fluid sealing structure.
Figure 2:
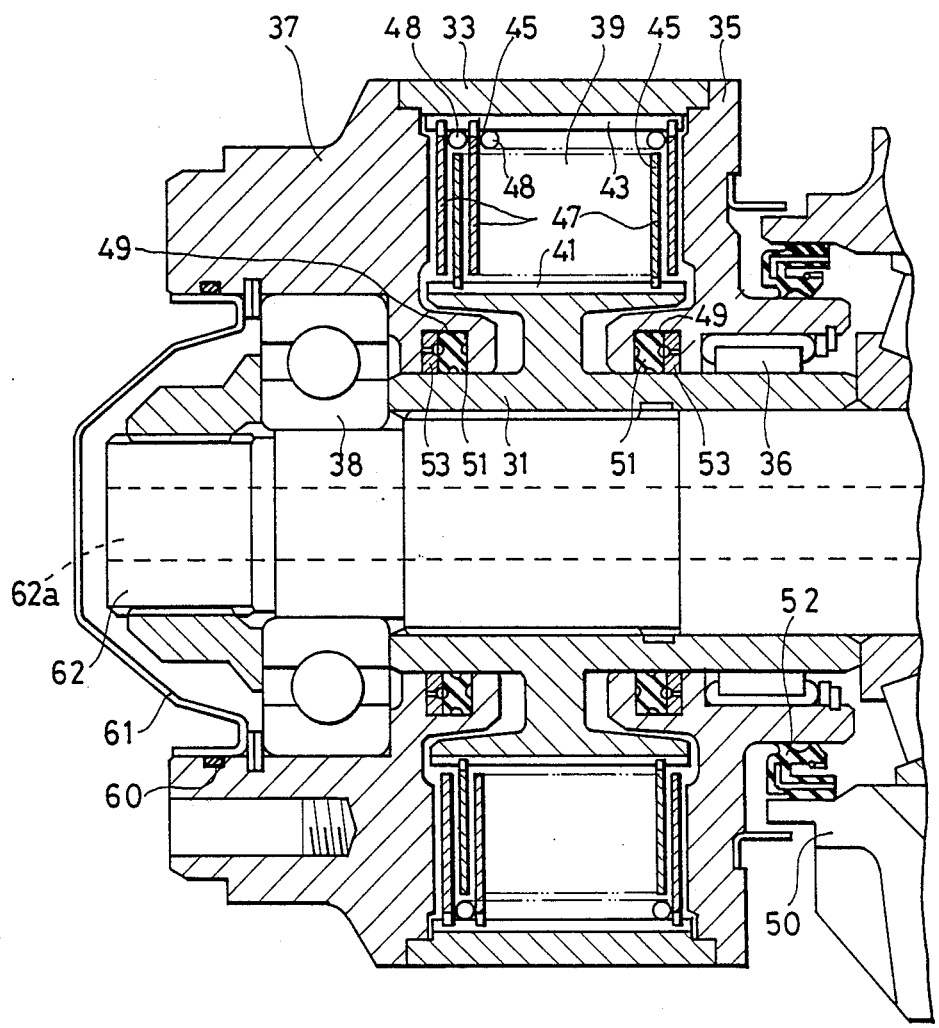
FIG. 2 is a cross-sectional view showing a viscous coupling to which the fluid sealing structure of the present invention is applied by way of example.

FIG. 2 shows a viscous coupling to which the fluid sealing structure of the present invention is applied, by way of example. This viscous coupling shown in FIG. 2 is disposed between a transfer case for distributing an engine power to the front and rear wheel shafts or a propeller shaft disposed on the rear wheel side.

The viscous coupling shown in FIG. 2 comprises roughly an inner shaft 31, an outer shaft 33 coaxial with the inner shaft 31, and two disk-shaped side walls 35 and 37. The outer circumferences of the two side walls 35 and 37 are fixed to the outer shaft 33 by welding so as to form a working chamber 39 in cooperation with the outer circumferential surface of the inner shaft 31. The outer shaft 33 is supported on the outer circumference of the inner shaft 31 so as to be rotatable relative to the inner shaft 31. The fluid working chamber 39 is filled with a viscous fluid such as silicon oil. Within the working chamber 39, an inner spline 41 is formed on the outer circumferential surface of the inner shaft 31 and an outer spline 43 is formed on the inner circumferential surface of the outer shaft 33. A plurality of fluid resistance plates 45 are fitted to the spline 41 and arranged at regular intervals so as to be slidable in the axial direction of the inner shaft 31. In the same way, a plurality of fluid resistance plates 47 are fitted to the spline 43 and arranged at regular intervals so as to be slidable in the axial direction of the outer shaft 33. Further, the reference numeral 48 denotes spacer rings disposed between the two fluid resistance plates 47 for locating these fluid resistance plates in place.

The two side walls 35 and 37 fixed to the outer shaft 33 are airtightly fitted to the inner shaft 31 via two sealing members 51 disposed in two recessed portions 49 formed on the inner circumferential surfaces of the two side walls 35 and 37, respectively. The side wall 35 is also rotatably supported by the inner shaft 31 via a needle bearing 36, and the side wall 37 is also rotatably supported by a rear wheel side output shaft 62 of the transfer case via a bearing 38.

Further, a seal 52 is disposed between the side wall 35 and the transfer case 50, and a seal 60 and a cap 61 are provided at an end of the side wall 37. A lubricating oil communication hole 62a communicating with the inside of the transfer case is formed at the axial center of the rear wheel side output shaft 62 of the transfer case 50. The needle bearing 36 and the bearing 38 are lubricated by gear oil charged in the transfer case 50.

Within each of the two recessed portions 49, there is disposed a sealing member 51 having an X-shaped cross section and made of an elastic body such as rubber, as disclosed in Japanese Published Unexamined (Kokai) Utility Model No. 57-179649, for instance. Further, a backup ring 53 made of ethylene tetrafluoride resin including copper powder is disposed in contact with the sealing member 51 at the side remote from the working chamber 39. This backup ring 53 expands in the radial direction thereof, when the pressure of the viscous fluid within the working chamber 39 rises and therefore the temperature within the working chamber 39 rises, in order to reduce a gap between the inner circumference of the backup ring 53 and the outer circumference of the inner shaft 31. Therefore, it is possible to prevent the elastic sealing member 51 from expanding in the axial direction of the inner shaft 31.

Figure 3:
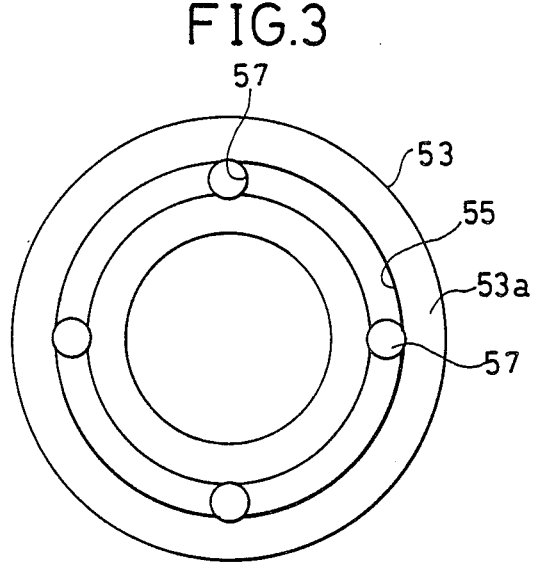
FIG. 3 is a plan view showing a backup ring incorporated in the fluid sealing structure of the present invention.
Figure 4:
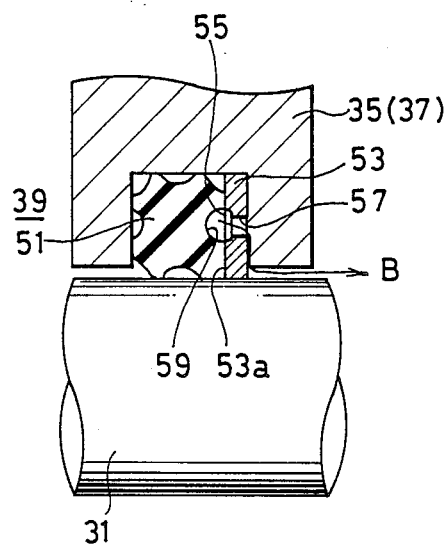
FIG. 4 is an enlarged partial cross-sectional view showing the sealing member and the backup ring incorporated in the viscous coupling shown in FIG. 2.

As shown in FIGS. 3 and 4, this backup ring 53 is formed with an annular groove 55 on one end surface thereof (on the side in contact with the sealing member 51) and a plurality of through holes (four in FIG. 3) arranged at regular angular intervals along the annular groove 55. Further, as best shown in FIG. 4, the annular groove 55 and the through holes 57 are located so as to correspond to one annular recessed portion 59 of the X-cross section sealing member 51. This recessed portion 59 is deformed when a pressure is applied to the sealing member 51.

Operation of the viscous coupling shown in FIG. 2 will be described hereinbelow.

When a rotational power is transmitted from the rear wheel side output shaft 62 to the inner shaft 31, a plurality of fluid resistance plates 45 fitted to the spline 41 of the inner shaft 31 are rotated, so that a plurality of fluid resistance plates 47 fitted to the spline 43 of the outer shaft 33 are also rotated on the basis of viscous resistance of the viscous fluid within the working chamber 39 to transmit power from the inner shaft 31 to the outer shaft 33.

However, when power is transmitted from the inner shaft 31 to the outer shaft 33 for many hours on the basis of differential operation of these two shafts or when the number of the differential revolution is extremely high, since the viscous fluid is heated and therefore expanded due to fluid friction between the resistance plates 45 and 47 and the viscous fluid, the pressure within the working chamber 39 rises. This pressure is applied to the sealing member 51 and therefore the sealing member 51 is compressed or deformed. In this case, since the lip portions (i.e. the projections) of the sealing member 51 are brought into more tight pressure contact with the surfaces of the side wall 35 or 37 or that of the inner shaft 31, it is possible to seal the viscous fluid. Further, under high pressure conditions, since the fluid temperature is high, the backup ring 53 is heated, expanded and serves to prevent the sealing member 51 from deformed into the space formed between the inner shaft 31 and the side wall 35 or 37.

On the other hand, when the differential revolution between the inner shaft 31 and the outer shaft 33 decreases and therefore the pressure within the working chamber 39 drops, gear oil scattered from the transfer case 50 seeps into between the sealing member 51 and the backup ring 53 and stays at the recessed portion 59 of the sealing member 51.

Under these conditions, even if the differential revolution begins and therefore the temperature within the working chamber 39 rises or the gear oil expands within the recessed portion 59 of the sealing member 51, the gear oil is discharged through the through holes (i.e. communication cavity) 57 formed in the backup ring 53 as depicted by the arrow B in FIG. 4. Therefore, the sealing member 51 is not urged toward the working chamber 39 by the expanded gear oil, thus preventing the damage of the lip (projected portions of the sealing member 51. In other words, it is possible to improve the sealing characteristics and the sealing durability of the sealing member 51. Further, whenever the outer shaft 33 is moved to an fro relative to the inner shaft 31 due to vibration during vehicle travel, gear oil tends to be charged into a space between the backup ring 53 and the sealing member 51. However, this gear oil can be readily discharged through the through holes 57, it is possible to prevent the sealing member 51 from being urged toward the working chamber 39 by the gear oil charged between the backup ring 53 and the sealing member 51, thus preventing the damage of the lip portions of the sealing member 51.

In the above-mentioned embodiment, since plural through holes 57 are formed in the backup spring 53, when one hole 57 is clogged, gear oil flows along the annular groove 57 and then discharged through other holes 57.

In the above-mentioned embodiment, only a single annular groove 55 is formed on one surface of the backup ring 53. However, this annular groove 55 is not necessarily required. Or else, it may be possible to form two similar annular grooves 57 on both the surfaces of the backup ring 53. In this case, it is unnecessary to arrange the assembly direction of the backup ring 53 when the backup ring 53 is assembled into the recessed portion 49.

Further, it is also possible to form only a single or five or more holes 57 on the backup ring 57.

Figure 5A:
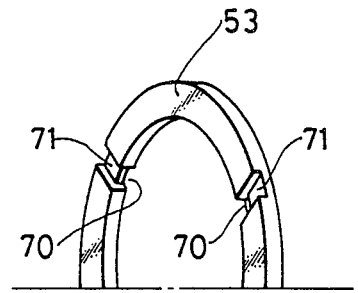
FIG. 5(A) is a partial perspective view showing another embodiment of the backup ring incorporated in the fluid sealing structure of the present invention.

FIG. 5(A) shows another embodiment of the backup ring 53, in which a plurality of radially extending grooves 71 are formed on at least one surface of the backup ring 53 at regular angular intervals along the annular groove and further a cutout 70 is formed at a radially innermost end of each of the radially extending groove 71, in place of the through holes 57. In this case, the radial grooves 71 communicate with the recessed portion 59 of the elastic member 51.

Figure 5B:
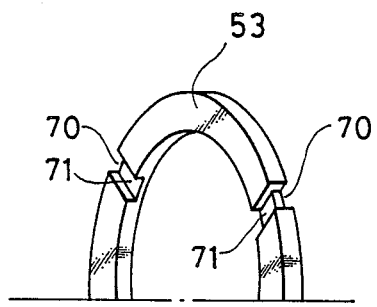
FIG. 5(B) is a partial perspective view showing still another embodiment of the backup ring incorporated in the fluid sealing structure of the present invention.

FIG. 5(B) shows still another embodiment of the backup ring 53, in which a plurality of radially extending grooves 71 are formed on one surface of the backup ring 53 at regular angular intervals along the annular groove and further a cutout 70 is formed at a radially outermost end of each of the radially extending groove 71, in place of the through holes 57. In the same way, the radial grooves 71 communicate with the recessed portion 59 of the elastic member 51.

What is claimed is:
1. A fluid sealing structure, comprising:
    (a) an inner shaft;
    (b) an outer shaft rotatably coupled coaxially with said inner shaft so as to provide a fluid working chamber in cooperation with said inner shaft;
    (c) an annular sealing member disposed between said inner shaft and said outer shaft, for rotatably sealing said inner and outer shafts; and
    (d) a backup ring arranged in parallel to said annular sealing member, for supporting said annular sealing member, said backup ring being formed with at least one communication cavity for discharging fluid, charged from outside to between said sealing member and said backup ring when pressure within the fluid working chamber drops, after pressure within the working chamber rises, so that the sealing member is not deformed into damage due to expansion of the charged fluid at high temperature.
2. The fluid sealing structure of claim 1, wherein said communication cavity comprises:
    (a) at least one annular groove formed on one surface of said backup ring; and
    (b) a plurality of through holes formed at regular angular intervals along said annular groove.
3. The fluid sealing structure of claim 1, wherein said communication cavity comprises:
    (a) a plurality of radially extending grooves formed on at least one surface of said backup ring; and
    (b) a plurality of cutouts each formed at a radially innermost end of each of said radially extending grooves.
4. The fluid sealing structure of claim 1, wherein said communication cavity comprises:
    (a) a plurality of radially extending grooves formed on at least one surface of said backup ring; and
    (b) a plurality of cutouts each formed at a radially outermost end of each of said radially extending grooves.
5. A fluid sealing structure, comprising:
    (a) an inner shaft;
    (b) an outer shaft rotatably coupled coaxially with said inner shaft so as to provide a fluid working chamber in cooperation with said inner shaft;
    (c) an annular sealing member disposed between said inner shaft and said outer shaft, for rotatably sealing said inner and outer shafts; and
    (d) a back-up ring arranged adjacent to said annular sealing member, for axially supporting said annular sealing member along a common interface, said back-up ring and said sealing member being cooperatively configured to define an annular cavity at said interface, said back-up ring being formed with discharge means leading from said annular cavity to the exterior of said working chamber, whereupon fluid penetrating between said inner and outer shafts from the exterior of said working chamber to said interface will be received in said annular cavity and discharged therefrom via said discharge means back to the exterior of said working chamber, so that the sealing member is not deformed or damaged due to thermal expansion of fluid received at said interface.

* * * * *